Oct. 13, 1931.  A. A. GABRIELSON  1,827,686

FOLDABLE RULE

Filed Dec. 8, 1928

INVENTOR.
ARTHUR A. GABRIELSON.
BY HIS ATTORNEYS.

Patented Oct. 13, 1931

1,827,686

UNITED STATES PATENT OFFICE

ARTHUR A. GABRIELSON, OF MINNEAPOLIS, MINNESOTA

FOLDABLE RULE

Application filed December 8, 1928. Serial No. 324,624.

This invention relates to a rule or scale and particularly to a rule or scale of the folded type. While folding rules have heretofore been used, the structures generally have some objectionable features, among which are that the graduations and indications on the rule are on the outer side of the rule when the same is in folded condition and the fact that when the rule is laid down flat on a surface in extended condition the graduations are not immediately adjacent said surface. Some folding rules are made so that the sides do not come into one plane when in extended position and other common forms of rules require more than one kind of hinge.

It is an object of the present invention to provide a rule comprising sections hinged together so as to be folded to compact form, said sections being triangular in transverse section.

It is another object of the invention to provide a foldable rule comprising hinged sections, which sections are of triangular shape in transverse section and adapted to fold into the form of a prism, said sections being symmetrically placed with respect to the axis of said prism.

It is still another object of the invention to provide a foldable rule comprising sections of triangular shape in transverse section hinged together at their ends with hinges all of similar type, said sections being foldable together, with two of the sides of each section disposed radially about the axis of a prism formed by the folded sections.

It is still a further object of the invention to provide a foldable rule comprising sections of triangular shape in transverse cross section hinged together at their ends and having graduations along two sides thereof, said sections being foldable together with the edges formed by said two graduated sides being disposed substantially at the center of a prism, and with the other sides of said sections disposed outwardly.

These and other objects and advantages of the invention will be fully set forth in the following description made in connection with the accompanying drawings, in which like reference characters refer to similar parts throughout the several views, and in which:—

Figure 1:
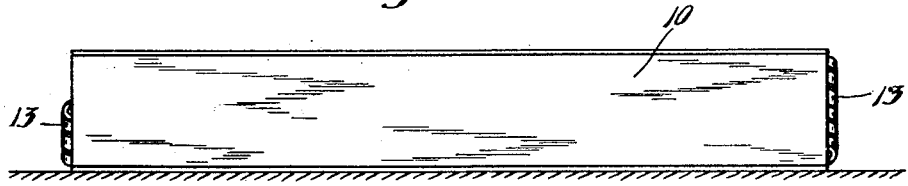
Fig. 1 is a view in side elevation of the rule in folded condition.
Figure 2:
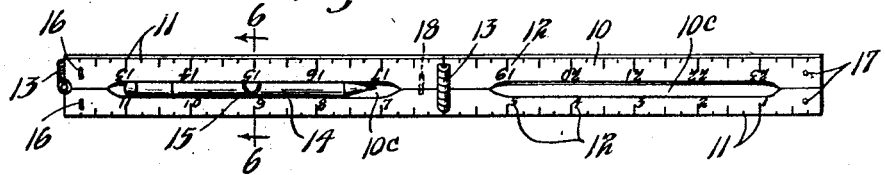
Fig. 2 is a view in side elevation of the rule in partly extended position.
Figure 4:
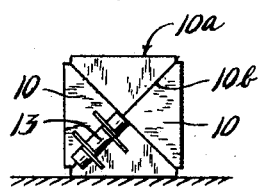
Fig. 4 is an end view of the rule.
Figure 5:
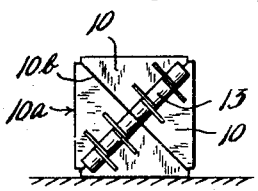
Fig. 5 is an end view of the rule at the end opposite that shown that in Fig. 4.
Figure 6:
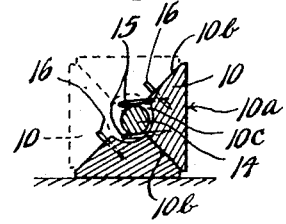
Fig. 6 is a vertical section taken on line 6—6 of Fig. 2, as indicated by the arrows, other portions of the rule being indicated by the dotted lines.
Figure 3:
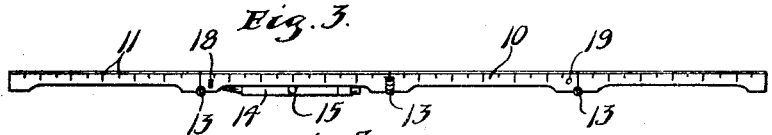
Fig. 3 is a view in side elevation of the rule in fully extended position.

Referring to the drawings, particularly to Figures 1 to 6, a rule is shown comprising a plurality of sections 10. While the number of sections may be varied, in the embodiment of the invention illustrated, four sections are shown. The sections 10 are similar and are triangular in transverse section. Each section has a side 10a and two other sides 10b the latter being similar. In the rule illustrated in Figs. 1 to 6, the sides 10b are disposed at an angle of substantially 90 degrees with each other and each makes an angle of substantially 45 degrees with the side 10a. The sides 10b are provided with graduations 11 and with indications 12, shown as numerals. While any desired graduations and indications may be used, in the embodiment of the invention illustrated, the rule is graduated to represent inches and parts thereof, which inches are designated by numerals, the rule shown in sections 1–6 inclusive having four sections each six inches long, thus making a rule 24 inches long when extended. Each section 10 is hinged to another section by hinges 13, these hinges being disposed at the ends of the sections and it is pointed out that all of the hinges 13 are of similar construction. The hinges 13 are so disposed that when the rule is in extended position as shown in Fig. 3 the sides 10a are all disposed in one common plane, forming an uninterrupted surface which can thus be laid down flat on another surface. The sections 10 intermediate their ends and upon their inner edges are provided with grooves 10c which, together, form a cylindrical recess when the rule is folded, in which a pencil 14 may be disposed, resilient clips 15 being inserted in one of the sections for holding the pencil and between which the pencil is inserted. Two of the sections 10 have pins 16 inserted therein adjacent one end, which pins project a short distance from said sections and are adapted to enter holes 17 formed adjacent the ends of the other two sections when the rule is in folded condition. Another pin 18 is disposed in the side 10b of one of the sections carrying the pins 16 and in the other side 10b of said section from that carrying the pin 16 and said pin 18 is adapted to enter a hole 19 in the other section having the pin 16 therein.

In operation the rule will be extended as shown in Fig. 3 when it is to be used. The sides 10a, as above stated, open into one plane and the rule can be laid flat on the surface where the measuring is to be done. It will be seen that when the rule is so disposed the graduations 11 will be immediately adjacent the surface on which the rule is resting and a mark can be easily and accurately made on the surface in line with these graduations. When the rule is in folded condition it not only is very compact, but the graduations 11 and indications 12 are at the inner side of the rule where they will be protected and not be rubbed by the clothing or engagement with other objects. The graduations and indications will thus be kept in clean and fresh condition. The rule can be quickly folded by swinging the sections about the hinge 13 shown at the left of Fig. 2 to bring the rule into the condition shown in Fig. 2 and by folding the sections together in pairs about the hinges shown in the center of Fig. 2. The rule can be extended by reversing this operation. When the rule is in folded condition the pins 16 enter the holes 17 and the pin 18 enters the hole 19. These pins prevent any radial shifting of the sections along their engaging sides. It will be seen that the rule, when folded, is in the form of a prism, a transverse section of which is a regular polygon.

Figure 7:
Fig. 7 is a view in side elevation of a modified form.
Figure 8:
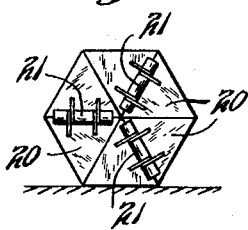
Fig. 8 is an end view of the rule shown in Fig. 7.
Figure 9:
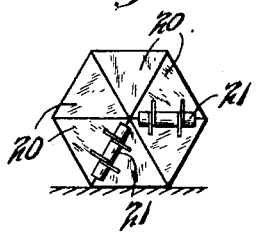
Fig. 9 is an end view of the rule shown in Fig. 7 showing the end opposite that shown in Fig. 8.

In Figs. 7, 8 and 9 a rule of similar construction is shown except that the same comprises six sections 20, each of which is of triangular shape in cross section, said triangles each being an equilateral triangle. The sections are connected by hinges 21 at their ends disposed as shown in Figs. 8 and 9 so that said rule when folded forms a prism, the transverse section of which is a regular hexagon. In other respects the rule will be like that shown in Figs. 1 to 6.

In opening the rule shown in Figs. 7 to 9, three of the sections will be simultaneously swung away from the other three sections about the hinge shown in the lower right hand corner of Fig. 8. Four of the sections will then be swung in pairs respectively about the hinges shown in Fig. 9 and two of the sections will then respectively be swung about the hinges shown at the left hand side and upper right hand corner of Fig. 8. The rule will then be in extended position with sides of the sections shown in the outer sides of Figs. 8 and 9 in one plane. The graduations will be on the sides of the sections 20 which are at the inner side of the rule when in folded condition, as already explained in connection with Figs. 1 to 6.

From the above description it is seen that applicant has provided a simple and improved structure of folding rule. The rule can be made by using hinges all of one type, the graduations are conveniently disposed for marking the surface to be measured and the graduations are protected when the rule is in folded condition. The device can be made of convenient size and of easily procurable material. The same has been amply demonstrated in actual practice and found to be very successful and efficient.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A foldable rule comprising a plurality of elongated sections, each of triangular shape in transverse section, and hinges connecting the ends of said sections so that when the rule is in folded condition the same comprises a regular polygon and the angles of said sections having vertices at said edges equalling substantially 360° divided by the number of sections in cross section with certain longitudinal edges of said sections disposed adjacent the center of said polygon.

2. A foldable rule comprising a plurality of elongated sections, each triangular in transverse section, a plurality of hinges at opposite ends of said rule respectively when folded, said hinges connecting the adjacent ends of certain of said sections, whereby said sections when in an extended position have corresponding sides disposed in one uninterrupted plane surface and when in folded condition form a prism with said sides forming the outer sides thereof.

3. A foldable rule comprising a plurality of elongated sections, each of triangular shape in transverse section, each of said sections having graduations on two adjacent sides thereof extending to the edges of said sides remote from their common edge, hinges connecting said sections at their ends so that said sections fold into a prism, with said sections having the sides thereof carrying the graduations extending in radial planes at opposite sides of the axis of said prism.

4. A foldable rule comprising a plurality of elongated sections, each of triangular shape in transverse section each having graduations on two of the adjacent sides thereof, which graduations extend to the edges of said sides remote from their common edge, hinges connecting the ends of said sections and disposed relatively to the sides of said sections so that said sections fold into substantially the form of a prism a cross section of which, at right angles to its axis, is a regular polygon with the sides other than those carrying the graduations forming the outer sides of said prism.

5. A foldable rule comprising a plurality of elongated sections, each of triangular shape in transverse section, and similar hinges connecting the ends of said sections so that said sections fold into the form of a prism a cross section of which, at right angles to its longitudinal axis, is a regular polygon, said hinges being disposed at opposite sides of said rule respectively, when folded.

6. A foldable rule comprising a plurality of elongated sections, said sections being connected by hinges so as to be extended into a straight line, said sections each being of triangular shape in cross section and having similar angles at one corner each equal to 360° divided by the number of sections, said sections being foldable into a rule having substantially the length of one section with said angles directed inwardly and having their vertices substantially at the axis of a regular polygon.

In testimony whereof I affix my signature.

ARTHUR A. GABRIELSON.